United States Patent
Rohbogner et al.

(10) Patent No.: US 11,326,487 B2
(45) Date of Patent: *May 10, 2022

(54) METHOD AND CONTROL UNIT FOR OPERATING A SPARK-IGNITION INTERNAL COMBUSTION ENGINE OR A DUAL-FUEL INTERNAL COMBUSTION ENGINE OPERATED IN THE SPARK-IGNITION MODE

(71) Applicant: MAN Energy Solutions SE, Augsburg (DE)

(72) Inventors: Christoph Rohbogner, Augsburg (DE); Jens Lange, Friedberg (DE); Ingo Wilke, Tutzing (DE); Andreas Beck, Mertingen (DE)

(73) Assignee: MAN Energy Solutions SE, Augsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/848,279

(22) Filed: Apr. 14, 2020

(65) Prior Publication Data
US 2020/0340377 A1  Oct. 29, 2020

(30) Foreign Application Priority Data
Apr. 29, 2019  (DE) .................... 10 2019 111 012.2

(51) Int. Cl.
*F01M 11/04*   (2006.01)
*F01M 11/10*   (2006.01)
*F02D 19/00*   (2006.01)

(52) U.S. Cl.
CPC ......... *F01M 11/0458* (2013.01); *F01M 11/10* (2013.01); *F02D 19/00* (2013.01); *F01M 2011/1493* (2013.01); *F01M 2250/00* (2013.01)

(58) Field of Classification Search
CPC ...... F01M 11/10; F01M 11/0458; F02D 19/00
See application file for complete search history.

(56) References Cited

U.S. PATENT DOCUMENTS

2009/0139484 A1* 6/2009 Harris .................... F01M 11/12
                                                        123/196 S
2016/0376948 A1* 12/2016 Gruber ................. F01M 11/061
                                                        123/196 R

* cited by examiner

*Primary Examiner* — Kevin A Lathers
(74) *Attorney, Agent, or Firm* — Cozen O'Connor

(57) ABSTRACT

A method for operating an internal combustion engine that is supplied with lubricating oil via an oil circuit. A measurement value of the total base number and/or a measurement value of the oxidation of lubricating oil currently used in the oil circuit for the lubrication is detected. Dependent on the established measurement value of the total base number and/or dependent on the established measurement value of the oxidation an exchange oil quantity for the oil circuit is determined. Currently used lubricating oil to an extent corresponding to the exchange oil quantity is removed from the oil circuit and new lubricating oil to an extent corresponding to the exchange oil quantity is supplied to the oil circuit.

10 Claims, 1 Drawing Sheet

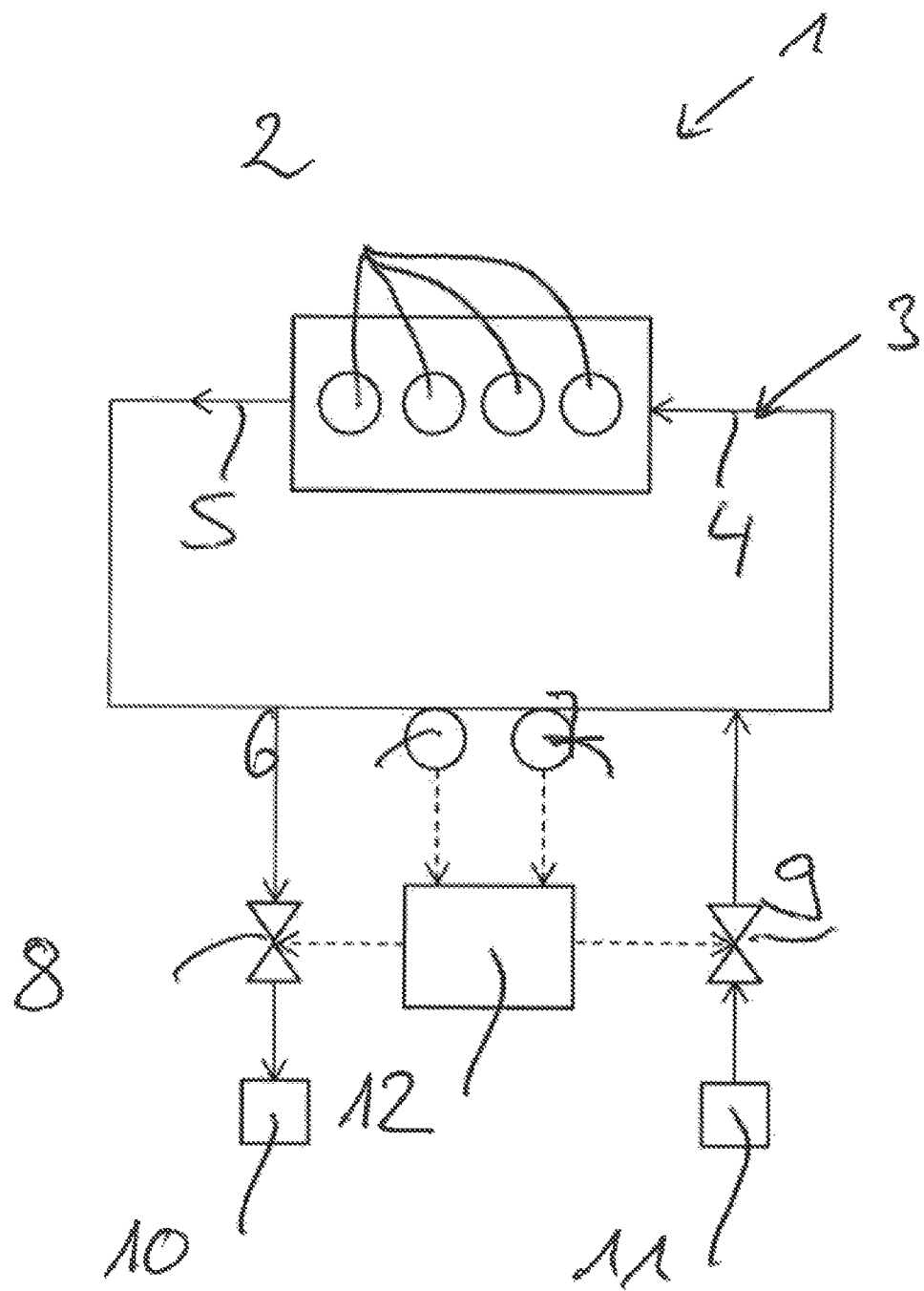

METHOD AND CONTROL UNIT FOR OPERATING A SPARK-IGNITION INTERNAL COMBUSTION ENGINE OR A DUAL-FUEL INTERNAL COMBUSTION ENGINE OPERATED IN THE SPARK-IGNITION MODE

BACKGROUND OF INVENTION

1, Field of the Invention

The invention relates to a method for operating a spark-ignition internal combustion engine or a dual-fuel internal combustion engine operated in the spark-ignition mode. The invention, furthermore, relates to a control unit for operating a spark-ignition internal combustion engine or a dual-fuel internal combustion engine operated in the spark-ignition mode.

One aspect of the invention relates to so-called large engines or large internal combustion engines whose cylinders have piston diameters of more than 140 mm, in particular of more than 175 mm. Such large internal combustion engines are for example ship engines.

2. Description of Related Art

Internal combustion engines have to be lubricated with lubricating oil during operation. In the process, the lubricating oil is subject to operation-related ageing. The ageing of the lubricating oil can result in the lubricating oil losing the lubricating effect and damage of the internal combustion engine occurs. This has to be avoided.

In the sector of so-called large engines it is usual that some of the lubricating oil enters the combustion chambers of the cylinders where it is combusted together with the fuel to be combusted. This operation-related lubricating oil consumption is compensated in that the lubricating oil circuit is supplied with fresh lubricating oil from time to time, namely in particular when too much lubricating oil has been combusted in the region of the cylinders.

Through the consumption or the combustion of the lubricating oil in the region of the cylinders and the replenishing of new lubricating oil for offsetting this oil consumption an adequate lubricating effect of the lubricating oil is mostly maintained in conventional large internal combustion engines so that it is not necessary to perform a complete oil change on the internal combustion engine, which would involve major expenditure.

However, the combusting of the lubricating oil in the region of the cylinders results in high exhaust gas emissions. With ever more stringent emission regulations combustion of lubricating oil is in the region of the cylinders should be avoided. In this case, the replenishment of combusted lubricating oil carried out in conventional large internal combustion engines is reduced. It is therefore necessary in internal combustion engines in which as little as possible lubricating oil is combusted in the region of the cylinders for improving the exhaust gas emissions to perform a complete oil change in particular when the ageing of the lubricating oil has advanced too much, which is expensive.

SUMMARY OF THE INVENTION

There is a need to be able to forgo a complete oil change also in such newer-type internal combustion engines in which in the region of the cylinders lubricating oil is only combusted to a minor extent.

One aspect of, the present invention is a new type of method and control unit for operating a spark-ignition internal combustion engine or a dual-fuel internal combustion engine operated in the spark-ignition operating mode.

One aspect of the invention relates to so-called large engines or large internal combustion engines whose cylinders have piston diameters of more than 140 mm, in particular of more than 175 mm. Such large internal combustion engines are for example ship engines.

According to one aspect of the invention, a measurement value of the total base number or a measurement value of the oxidation of the lubricating oil currently used in the oil circuit for the lubrication is detected. Dependent on the measurement value of the total base number and/or dependent on the measurement value of the oxidation, an exchange oil quantity for the oil circuit is determined. Currently used lubricating oil to the extent of the determined exchange oil quantity is removed from the oil circuit. Furthermore, new lubricating oil is supplied to the oil circuit to a degree corresponding to the determined exchange oil quantity. According to one aspect of the invention, it is proposed for the first time to detect the total base number (TBN) and/or the oxidation of the lubricating oil used by measurement. Dependent on the respective detected measurement value, the exchange oil quantity for the internal combustion engine is determined. To the extent of the exchange oil quantity, lubricating oil is then specifically removed from the oil circuit, wherein new lubricating oil is supplied to the lubricating oil circuit to the same extent. By way of this, a lubricating oil consumption can then be reproduced without repercussions on exhaust gas emissions. The lubricating oil removed from the oil circuit is collected in a collection tank and can be subsequently disposed of or used further. Thus, a complete oil change can be omitted even in internal combustion engines in which due to the design little lubricating oil is combusted in the region of the cylinders.

According to one aspect of the invention, the measurement value of the total base number and the measurement value of the oxidation of the lubricating oil currently used in the oil circuit for the lubrication is detected based on the determined measurement value of the total base number and on the determined measurement value of the oxidation an exchange oil quantity for the oil circuit is determined. Establishing the exchange oil quantity dependent on both measurements value, i.e. dependent both on the total base number and also dependent on the oxidation of the lubricating oil is particularly preferred to advantageously determine the exchange oil quantity for a spark-ignition internal combustion engine or a dual-fuel internal combustion engine operated in the spark-ignition mode.

According to one aspect of the invention, the exchange oil quantity for the oil circuit is determined dependent on the established measurement value of the total base number and/or dependent on the established measurement value of the oxidation as a function of the characteristic diagram or as a function of the characteristic curve. A determination of the exchange oil quantity as a function of the characteristic diagram or characteristic curve can be implemented particularly easily. For different support points of the measurement values of the total base number and/or of the oxidation, exchange oil quantities can be stored, wherein if required interpolation between individual measurement values can be carried out.

The control unit for operating a spark-ignition internal combustion engine or a dual-fuel internal combustion engine operated in the spark-ignition operating mode is defined.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

The FIGURE is a diagram of an internal combustion engine.

DETAILED DESCRIPTION OF THE PRESENTLY PREFERRED EMBODIMENTS

One aspect of the invention relates to a method and to a control unit for operating a spark-ignition internal combustion engine or a dual-fuel internal combustion engine operated in the spark-ignition operating mode.

The FIGURE shows a highly schematised diagram of an internal combustion engine 1, which comprises multiple cylinders 2 and an oil circuit 3. The oil circuit 3 serves for supplying in particular the cylinders 2 of the internal combustion engine 1 with lubricating oil, wherein the lubricating oil is supplied to the cylinders 2 of the internal combustion engine 1 via an advance 4 and discharged from the same via a return 5.

According to one aspect of the invention present here it is proposed to detect a measurement value of the total base number (TBN) and/or a measurement value of the oxidation of the lubricating oil currently used in the oil circuit 3 for the lubrication. The measurement value of the total base number of the lubricating oil currently used in the oil circuit 3 for the lubrication is detected with the help of a first sensor 6. The measurement value of the oxidation of the lubricating oil currently used in the oil circuit 3 for the lubrication is detected with the help of a second sensor 7.

The arrangement of the sensors 6 and 7 in the oil circuit is arbitrary. The two sensors 6 and 7 can also be combined into a unit.

Dependent on the established measurement value of the total base number and/or dependent on the established measurement value of the oxidation, an exchange oil quantity for the oil circuit 3 is determined. To this end, the two sensors 6, 7 transmit their respective measurement value to a control unit 12, which dependent on the measurement value of the total base number and/or dependent on the measurement value of the oxidation determines the exchange oil quantity for the oil circuit 3.

According to one aspect of the invention, currently used lubricating oil is removed from the oil circuit 3 to an extent corresponding to the determined exchange oil quantity, furthermore, new lubricating oil to an extent corresponding to the determined exchange oil quantity is supplied to the oil circuit 3. The control unit 12 determines control variables as a function of which this oil exchange is carried out.

Accordingly, the FIGURE shows a first valve 8 that can be directly or indirectly controlled by the control unit 12 subject to the intermediate connection of a further control unit, to remove lubricating oil to the extent corresponding to the determined exchange oil quantity from the oil circuit 3 and collect the same in a collection tank 10. Furthermore, the FIGURE shows a further valve 9 which can be likewise controlled emanating from the control unit 12 in order to supply the oil circuit 3 with new lubricating oil which is kept ready in a storage tank 11.

With one aspect of the invention it is proposed accordingly to remove a defined oil quantity from the oil circuit 3 dependent on the measurement value of the total base number and/or dependent on the measurement value of the oxidation of the lubricating oil currently used in the oil circuit 3 for the lubrication and exchange the same with new lubricating oil, namely to the extent of the exchange oil quantity established as a function of the respective measurement value.

In this way, an oil consumption can be reproduced in the region of the cylinders 2. A defined exchange oil quantity of new oil can be continuously supplied in order to maintain the lubricating oil characteristics of the lubricating oil and render a complete oil change on the internal combustion engine 1 superfluous.

The determination of the exchange oil quantity for the oil circuit dependent on the established measurement value of the total base number and/or dependent on the established measurement value of the oxidation takes place preferentially dependent on the characteristic diagram or characteristic curve. The characteristic map or the characteristic curve is stored in the control unit 12. For different support points of measurement values, exchange oil quantities are stored. Interpolation or extrapolation can be performed between individual support points.

The method is employed with spark-ignition internal combustion engines or dual-fuel internal combustion engines operated in the spark-ignition operating mode. In particular, the exchange oil quantity is determined dependent on the two measurement values, i.e. dependent both on the total based number and also dependent on the oxidation of the lubricating oil. This procedure is particularly preferred for spark-ignition internal combustion engines or dual-fuel engines operated in the spark-ignition operating mode.

The invention, furthermore, relates to a control unit 12 for carrying out the method. The control unit is equipped to carry out the method described above on the control side. To this end, the control unit 12 comprises data interfaces to exchange data with the assemblies involved in carrying out the method according to the invention, in particular with the sensors 6 and 7 and the valves 8 and 9. Furthermore, the control unit 12 as assembly on the hardware side comprises a processor for the data processing and a memory for data storage. Furthermore, the control unit 12 comprises, on the software side, program modules that serve for carrying out the method according to the invention.

The control unit 12 receives from the respective sensors 6, 7 the respective measurement value, preferentially the measurement value of the total base number from the sensor 6 and the measurement value of the oxidation from the sensor 7. Dependent on the respective measurement value, the control unit 12 determines the exchange oil quantity. Dependent on the exchange oil quantity, the control unit 12 emits control signals, as a function of which the oil exchange takes place, as a function of which accordingly currently used lubricating oil is removed from the oil circuit 3 and new lubricating oil supplied to the oil circuit 3.

One aspect of the invention relates to the sector of so-called large engines or large internal combustion engines whose cylinders have piston diameters of more than 140 mm, in particular of more than 175 mm. Such large internal combustion engines are for example marine engines. In the invention, these are embodied as spark-ignition internal combustion engines or as dual-fuel internal combustion engines operated in the spark-ignition operating mode. As fuel, such internal combustion engines combust gaseous fuel such as natural gas or liquid fuel such as methanol. Internal combustion engines combusting gaseous fuel are also referred to as gas engines.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating an internal combustion engine, comprising:
   supplying the internal combustion engine with lubricating oil via an oil circuit for lubrication;
   detecting a measurement value of a total base number and/or a measurement value of an oxidation of a currently used lubricating oil that is in the oil circuit;
   determining an exchange oil quantity for the oil circuit based at least in part on the measurement value of the total base number and/or the measurement value of the oxidation;
   opening a first valve and removing a volume of the currently used lubricating oil from the oil circuit corresponding to the exchange oil quantity; and
   opening a second valve and adding a volume of new lubricating oil to the oil circuit to an extent corresponding to the exchange oil quantity.

2. The method according to claim 1, further comprising:
   detecting the measurement value of the total base number;
   detecting the oxidation of the currently used lubricating oil in the oil circuit; and
   determining the exchange oil quantity for the oil circuit based at least in part on the measurement value of the total base number and the measurement value of the oxidation.

3. The method according to claim 2, wherein the measurement value of the total base number of the currently used lubricating oil in the oil circuit is detected with a first sensor.

4. The method according to claim 1, wherein the measurement value of the oxidation of the currently used lubricating oil in the oil circuit is detected with a second sensor.

5. The method according to claim 2, wherein the exchange oil quantity for the oil circuit is determined based at least in part on the measurement value of the total base number and/or the measurement value of the oxidation as a function of a characteristic map or a characteristic curve.

6. A control unit for operating an internal combustion engine, wherein the control unit is configured to:
   receive from a sensor a measurement value of a total base number and/or receive from a sensor a measurement value of an oxidation of a currently used lubricating oil in an oil circuit configured to lubricate the internal combustion engine;
   determine an exchange oil quantity based at least in part on the measurement value of the total base number and/or the measurement value of the oxidation;
   emit a first control signal, the first control signal configured to control a first valve, as a function of which the currently used lubricating oil is removable from the oil circuit to an extent corresponding to the determined exchange oil quantity is removable; and
   emit a second control signal, the second control signal configured to control a second valve, as a function of which new lubricating oil is suppliable to the oil circuit to an extent corresponding to the determined exchange oil quantity.

7. The control unit according to claim 6, wherein the control unit is further configured to:
   detect a measurement value of a total base number;
   detect the oxidation of the currently used lubricating oil in the oil circuit; and
   determine the exchange oil quantity for the oil circuit based at least in part on the measurement value of the total base number and the measurement value of the oxidation.

8. The control unit according to claim 6, wherein the control unit is further configured to:
   determine the exchange oil quantity for the oil circuit based at least in part on the measurement value of the total base number and/or the measurement value of the oxidation as a function of a characteristic map or a characteristic curve.

9. The method according to claim 1, wherein the internal combustion engine is a spark-ignition internal combustion engine or a dual-fuel internal combustion engine operated in a spark-ignition operating mode.

10. The control unit according to claim 6, wherein the internal combustion engine is a spark-ignition internal combustion engine or a dual-fuel internal combustion engine operated in a spark-ignition operating mode.

* * * * *